United States Patent [19]

Hirukawa

[11] Patent Number: 5,331,679
[45] Date of Patent: Jul. 19, 1994

[54] FUEL SPACER FOR FUEL ASSEMBLY

[75] Inventor: Koji Hirukawa, Yokohama, Japan

[73] Assignee: Kabushiki Kaisha Toshiba, Kawasaki, Japan

[21] Appl. No.: 987,195

[22] Filed: Dec. 8, 1992

[30] Foreign Application Priority Data

Dec. 9, 1991 [JP] Japan .................. 3-324478

[51] Int. Cl.⁵ .............................. G21C 3/34
[52] U.S. Cl. ........................ 376/439; 376/462
[58] Field of Search .......... 376/438, 439, 462; 976/DIG. 80, DIG. 81

[56] References Cited

U.S. PATENT DOCUMENTS

| | | | |
|---|---|---|---|
| 3,847,736 | 11/1974 | Bevilacqua | 376/439 |
| 3,886,038 | 5/1975 | Raven | 376/439 |
| 4,056,441 | 11/1977 | Marmonier et al. | 376/438 |
| 4,061,536 | 12/1977 | Creagan et al. | 376/439 |
| 4,172,761 | 10/1979 | Raven et al. | 376/462 |
| 4,692,302 | 9/1987 | DeMario et al. | 376/439 |
| 4,775,510 | 10/1988 | Bryan | 376/443 |
| 4,999,153 | 3/1991 | Johansson et al. | 376/443 |
| 5,002,726 | 3/1991 | Johansson | 376/448 |
| 5,112,571 | 5/1992 | Orii et al. | 376/439 |
| 5,173,251 | 12/1992 | Ullrich et al. | 376/389 |
| 5,272,741 | 12/1993 | Masuhara et al. | 376/439 |

FOREIGN PATENT DOCUMENTS 64-73292 3/1989 Japan .
1-217294 8/1989 Japan .
2-285286 11/1990 Japan .
3-61599 6/1991 Japan .

*Primary Examiner*—Donald P. Walsh
*Assistant Examiner*—Meena Chelliah
*Attorney, Agent, or Firm*—Foley & Lardner

[57] ABSTRACT

A fuel spacer for a fuel assembly comprises a plurality of tubular ferrules each forming a fuel rod insertion passage, a belt-like support member for supporting the tubular ferrules bundled in a lattice arrangement and a spring member for axially supporting the fuel rods disposed in the ferrules. The adjoining ferrules are joined together horizontally, each of the ferrules has at least one end to which a plurality of cutout portions are formed circumferentially of the end portion and at least one flat portion is formed between adjoining petal portions at which the adjoining ferrules are spot welded. Each of the cutout portions and petal portions of the tubular ferrule has various shapes such as trapezoidal, rectangular, triangular, V or M shape. The cutout portions and petal portions may be formed at both axial ends of the tubular ferrule. The adjoining ferrules are joined together such that an end portion of one ferrule to which the cutout portions are formed is spot welded to an end portion of another ferrule to which any cutout portion is not formed. The petal portions formed on a downstream side with respect to a coolant flow in a fuel assembly is twisted outward to provide revolutional flow and an opened end of the ferrule.

20 Claims, 12 Drawing Sheets

FUEL SPACER FOR FUEL ASSEMBLY

BACKGROUND OF THE INVENTION

The present invention relates to a fuel spacer for a fuel assembly and, more particularly, an independent cell type fuel spacer for the fuel assembly.

A known fuel spacer for a fuel assembly incorporated in a boiling water type reactor has a structure, as for example, is disclosed in the Japanese Patent Laid-open (KOKAI) No. 59-65287 (65287/1984) and shown in FIG. 15. Referring to FIG. 15, the fuel spacer is composed of a plurality of tubular ferrules 41 in each of which a fuel rod is charged and these tubular ferrules 41 are arranged in a lattice structure, in which the adjoining ones are joined together by welding means, for example. A water rod is also charged in the tubular ferrule 41. As shown in FIG. 15, the ferrule 41 has inward projections 13b formed to its cylindrical wall, and a cutout 15 is formed to the ferrule wall and a pawl portion 16 is also formed so as to project in the cutout 15.

Also known are cylindrical ferrules 42 each having an octagonal cross section as shown in FIG. 16, in which each ferrule 42 has inward projections 43 formed to the cylindrical wall thereof and reference numeral 44 denotes a continuous loop spring.

Furthermore, there has been also studied a fuel spacer to be utilized for a fuel assembly in which a water rod has an outer diameter larger than an inner diameter of a cylindrical ferrule, such as that disclosed in the Japanese Patent Laid-open (KOKAI) No. 61-198096 (198096/1986).

Recently, there has been developed an analysis of a mechanism between a transition boiling generation and a shape of a fuel spacer of a fuel assembly. Namely, it has been found out that transition boiling is likely to be generated at a portion near the lower ends of a first or second fuel spacer from the upper side of the fuel assembly in an installed state at a time when a power of the fuel assembly approaches its critical power output (at present, seven or eight fuel spacers are disposed axially along the fuel assembly). The fuel spacer acts to deposit liquid drops of a coolant to a surface of a fuel rod on a downstream side of the fuel spacer by agitating two phase flows of steam and liquid, thereby making the thickness of a liquid film thicker. As a result, the critical power output increases, contributing in the increasing of thermal margin of the fuel, increasing the power density of a reactor and increasing the power generation capacity. Accordingly, it has been considered to increase the number of the fuel spacers to be arranged.

However, increasing of the number of the fuel spacers results in the increasing of fuel axial pressure loss. Because fuel spacers each have a relatively large local pressure loss due to rapid constriction or expansion of flow sectional area, and fuel spacer local pressure loss occupys a large portion of axial pressure loss. It provides a problem in stability of the fuel assembly and increasing the necessary lift of a pump for circulating a coolant in a core, which also results in an economical disadvantage.

SUMMARY OF THE INVENTION

An object of the present invention is to substantially eliminate defects or drawbacks encountered in the prior art described above and to provide a fuel spacer for a fuel assembly capable of achieving a reduced pressure loss of the fuel spacer and improving the limit power output of the fuel assembly.

This and other objects can be achieved according to the present invention by providing a fuel spacer assembly for a fuel assembly comprising:
- a plurality of tubular ferrules each forming a fuel rod insertion passage in which a fuel rod is inserted;
- a support means in the shape of belt for supporting a periphery of the tubular ferrules bundled in a lattice arrangement; and
- a spring means for axially supporting the fuel rods disposed in the ferrules,
- wherein each of the tubular ferrules has a cylindrical wall to which an inward projection is formed to support the fuel rod, adjoining ferrules are joined together horizontally, each of the ferrules having at least one end to which a plurality of cutout portions are formed circumferentially of the end portion, and flat portions being formed in some of cutout portions, and the adjoining ferrules being spot welded to each other at flat portions thereof.

Four cutout portions are preferably formed to at least one end of the ferrule and each cutout portion may take various shapes such as substantially rectangular, trapezoidal or triangular shapes, or in combination thereof.

The cutout portions may be formed to both axial ends of each of the ferrules so as to have the same shape or different shapes.

The petal portions formed to an end portion of the ferrule on a downstream side are twisted outward with respect to a coolant flow between fuel rods to provide an opened end of the ferrule revolution flow.

According to the preferred embodiments of the present invention, as described above, the tubular ferrule of the fuel spacer provides the cross sectional change in a trapezoid shape with respect to the coolant flow direction in the fuel assembly instead of a rectangular shape as made in the conventional art. Accordingly, the local pressure loss caused by the rapid constriction or expansion of the coolant flow passage at the location of the fuel spacer can be made small, and the liquid films formed on the surfaces of the fuel rods supported by the fuel spacer cannot be peeled off. Consequently, the pressure loss of the fuel spacer is made small in comparison with the usage of the conventional ferrules, and the critical power output of the fuel assembly can be also improved.

Further natures and features of the present invention will be made more clear hereinlater, through description with reference to the accompanying drawings.

DESCRIPTION OF THE PREFERRED EMBODIMENTS

A first preferred embodiment of a fuel spacer according to the present invention will be described hereunder with reference to FIG. 1 to 6.

Figure 1:
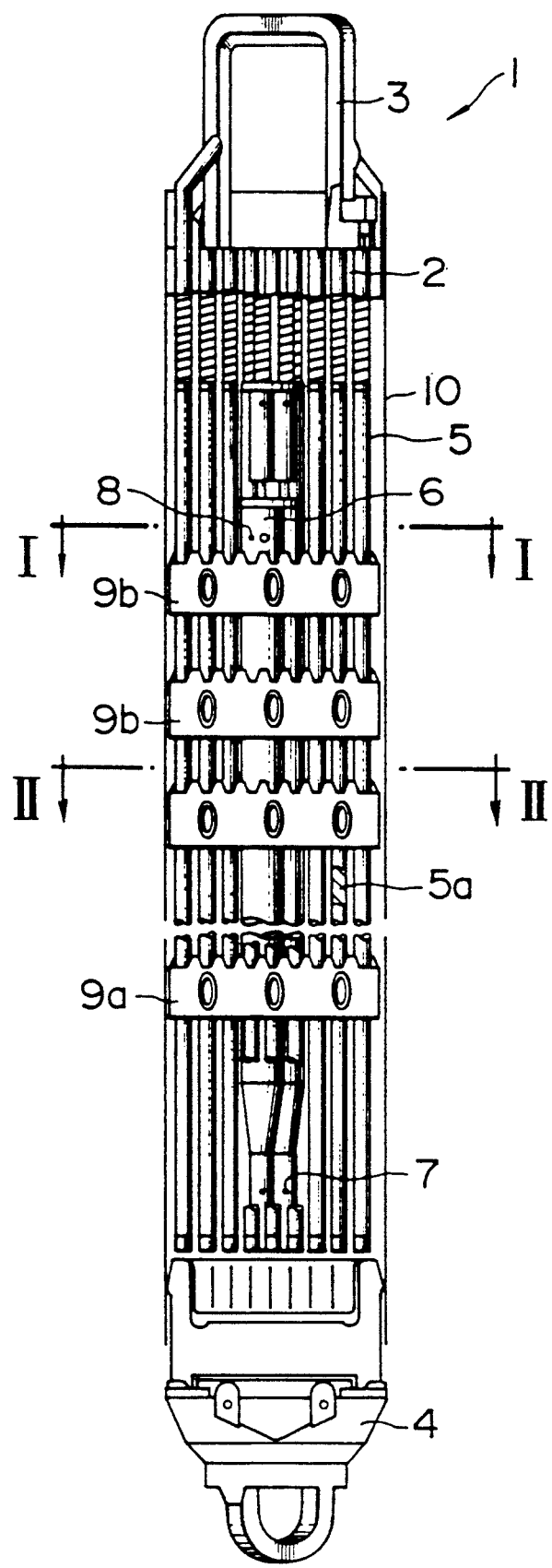
FIG. 1 is an elevation showing one example of a fuel assembly to which a fuel spacer according to the present invention is applicable.

Referring to FIG. 1, showing a fuel assembly to be incorporated in a boiling water reactor, the fuel assembly 1 comprises an upper tie plate 2 to which a handle 3 is secured, a lower tie plate 4 disposed on the opposite side of the upper tie plate 2, a number of fuel rods 5 which are supported at both axial ends by the upper and lower tie plates 2 and 4, water rods 6 arranged within an arrangement of the fuel rods 5, and a plurality of fuel spacers 9a and 9b arranged in the axial direction of the fuel rods 5.

The fuel rods 5 and the water rods 6 are supported by the fuel spacers 9a and 9b with their horizontal distances being kept constant with each other. These fuel rods 5 and the water rods 6 are assembled in a bundle by the fuel spacers 9a and 9b and the bundle is surrounded by a channel box 10, which is secured to the upper tie plate 2.

Several fuel rods 5 may be replaced with fuel rods 5a each having a short axial length, called short fuel rod 5a hereinlater, and only the lower ends of the short fuel rods 5a are supported by the lower tie plate 4. The water rods 6 may also be supported only at its lower end by the lower tie plate 4. The channel box 10 maybe secured to the lower tie plate 4 instead of the upper tie plate 2. To the lower end portion of each of the water rods 6 is formed a coolant flow-in port 7 and to the upper end portion thereof is formed a coolant flow-out port 8.

Figure 2A:
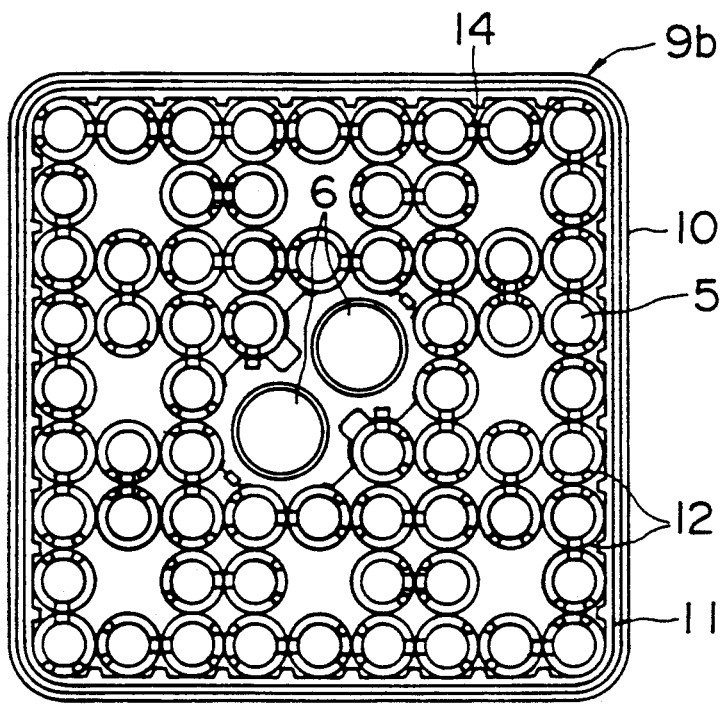
FIG. 2A is a cross sectional view, in an enlarged scale, taken along the line I—I of FIG. 1.

As shown in FIGS. 2A', 2B and 3 the fuel spacers 9a and 9b are formed by tubular ferrules 12 of the numbers corresponding to the numbers of the fuel rods 5 and the short fuel rods 5a in a lattice arrangement and the outer periphery of the bundle of the tubular ferrules 12 is surrounded by a support band 11 in the shape of a belt. The lattice arrangement of the tubular ferrules 12 are joined with adjoining lattice arrangement thereof by means of spot welding.

Figure 3:
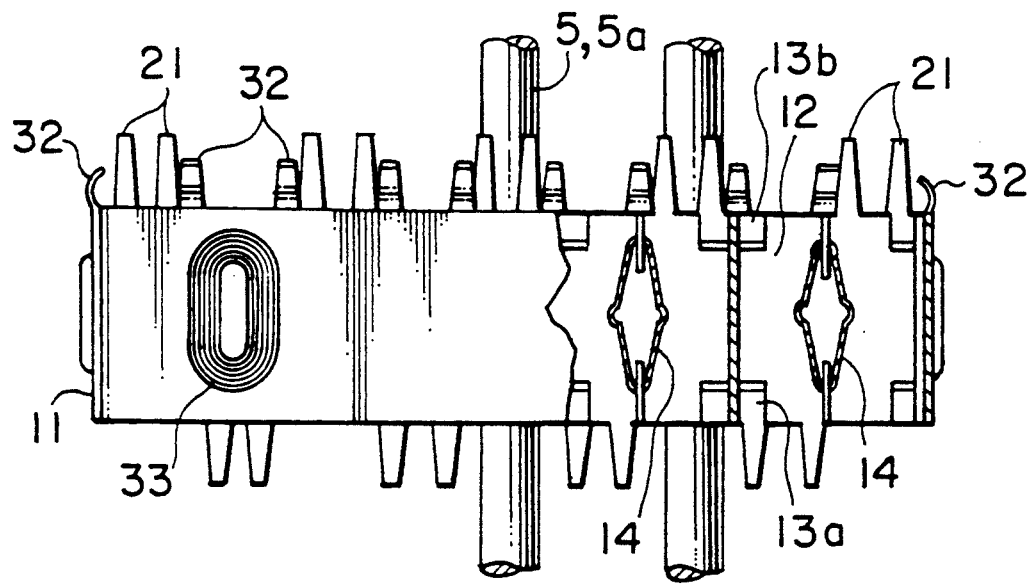
FIG. 3 is a side view, partially broken away, on an enlarged scale, of the fuel spacer of FIG. 1.
Figure 4:
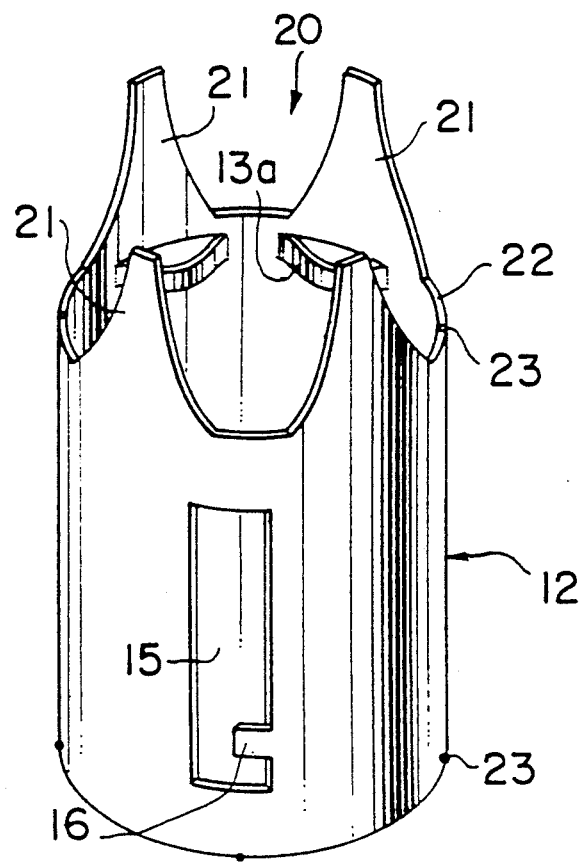
FIG. 4 is a perspective view of a first embodiment of a tubular ferrule utilized for the fuel spacer according to the present invention.

One end of the tubular ferrule 12 is formed so as to provide four trapezoidal or triangular petal portions with cutting off some part of end portion, separated by equal distances in the circumferential direction of the tubular ferrule 12. In the illustration of FIG. 4, the trapezoidal petal portions 21 and cutouts 20 are formed around the end portion by cutting out some parts of the end portion of the ferrule 12. Two projections 13a projecting inward from the ferrule 12 are formed thereto at portions below the trapezoidal petal portions 21 and other projections 13b are also formed to the ferrule 12 at portions near the other end portion to which any cutout portion is not formed. These projections 13a and 13b are formed by inwardly projecting portions of the tubular wall of the ferrule itself. The ferrules 12 each of the structure shown in FIG. 3 are arranged in a lattice in alternatingly reverse, i.e. upside down, axial attitudes.

Figure 5:
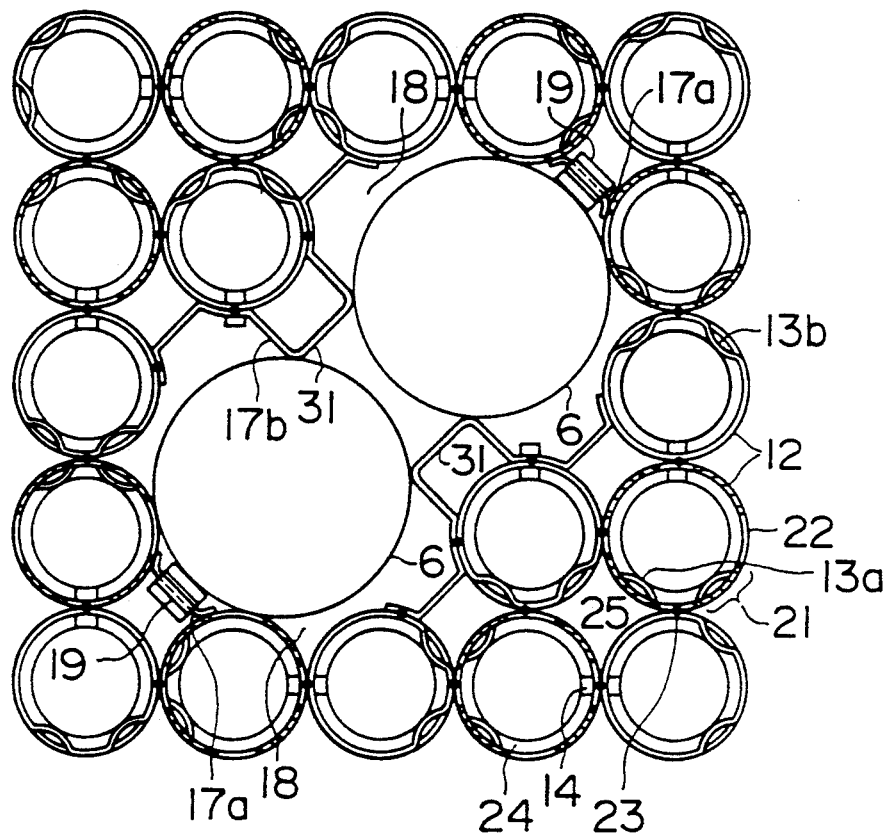
FIG. 5 is a front view, in an enlarged scale, showing a central portion of the fuel spacer.

As shown in FIG. 4, each ferrule 12 provides four petal portions 21 each having trapezoidal shape and portions between the adjoining petal portions 21 are formed each having a flat bottom portion 22 having a point 23 at which the ferrule 12 is joined by means of spot welding with the point 23 of an end portion provided with no petal portions of an adjacent another ferrule 12. The points 23 of the other ends of the ferrule 12 as shown in FIG. 4 opposite the end having the petal portions 21 are also joined by means of spot welding with points 23 of the flat portions 22 of another ferrule 12 disposed adjacently. This state is shown in FIG. 5, from which the lattice arrangement of the ferrules 12 will be understood with the assistance of FIG. 3. As shown in FIGS. 3 and 5, the number of ferrules 12 are arranged in a lattice with adjoining ferrules 12 are reversely arranged in their axial attitudes and respective adjoining ferrules 12 are joined with each other by means of spot welding at points 23 formed to both axial ends of the respective tubular ferrules 12.

Figure 6B:
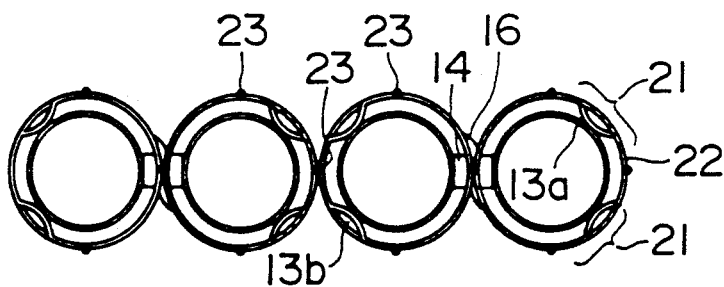
FIGS. 6A and 6B are side and top end views showing an arrangement between fuel rods and loop springs for the fuel spacer.
Figure 6A:
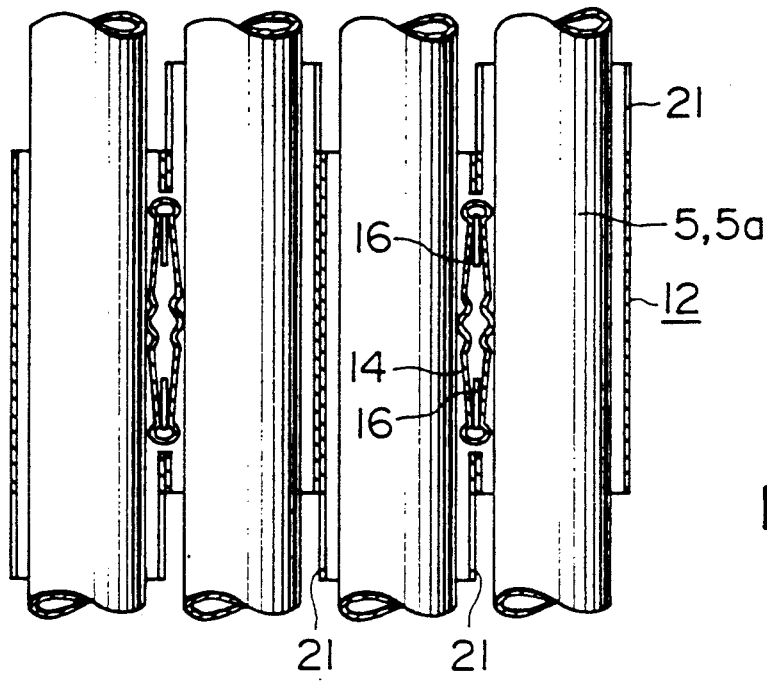

FIGS. 6A and 6B are an elevational view and cross sectional view, respectively, showing a relationship between the fuel rods 5 and 5a and the tubular ferrules 12. Referring to FIGS. 6A and 6B, a continuous loop spring 14 is disposed so as to span the adjoining two tubular ferrules 12 and the loop spring 14 has an outwardly projected portion at its vertically central portion as shown in FIG. 6A.

The continuous loop spring 14 is attached to the ferrule 12 at its one end so that the one end is engaged with the pawl piece 16 projecting inside the cutout portion 15 formed substantially rectangularly to the side wall of the tubular ferrule 12 as shown in FIG. 4. The pawl piece 16 is formed to a portion near one end, i.e. lower end as viewed, of the rectangular cutout portion 15. The other one end of the loop spring 14 is attached to the pawl piece 16 of the adjoining tubular ferrule 12 arranged in an axially upside down attitude, and so the loop spring 16 for pressing the fuel rods in the fuel assembly are supported between the adjoining two tubular ferrules 12 arranged in axially reversed attitudes. Accordingly, it is to be noted that the respective tubular ferrules 12 are arranged in a lattice in their vertical attitudes in which one ferrule 12 has the upper end provided with the petal portions 21 and another one adjoining to this one ferrule 12 has the lower end provided with the petal portions 21.

According to this embodiment, as shown in FIG. 5, the structure of each of the fuel spacers 9a and 9b has a central vacant portion 18 formed by removing seven ferrules 12 arranged at the central portion of the fuel spacer 9a(9b). Namely, at the central portion of the fuel spacer is formed an elongated vacant portion 18 which is defined by side walls of centrally arranged ten tubular ferrules 12. Two bridging members or pieces 17a and two bridging members or pieces 17b are respectively disposed diagonally opposingly inside the elongated vacant portion 18.

Both the ends of the bridging pieces 17a are secured, by spot welding means, to the side walls of the adjoining two ferrules 12, constituting both ends of the elongated vacant portion, of the ten ferrules 12 defining the vacant portion 18. Each of the bridging pieces 17a is composed of upper and lower two plate members having a recessed portion formed to an upper or lower end to which the continuous loop spring 19 is mounted. This portion is welded after the assembling thereby to form one bridging piece 17a, and thereafter, the bilateral end portions of the bridging piece 17a are spot welded to the upper and lower ends of the tubular ferrule 12.

Each of the other bridging pieces 17b combines three tubular ferrules 12 constituting the above-mentioned ten ferrules 12 and forms a bent portion 31 projecting in a diagonal direction of the fuel spacer 9a (9b), and the water rods 6 are supported by the corner portions of this bent projected portion 31. Namely, in the illustration of FIG. 5, two water rods 6 are supported by the corner portions of the projected portions 31 of the two bridging pieces 17b disposed diagonally in the fuel spacer. The bilateral ends and the root of the bent projected portion of each of the bridging pieces 17b are formed so as to have substantially the same curvature as that of the side wall of the tubular ferrule 12, and at these portions are spot-welded the upper and lower end of the bridging piece 17b to the adjoining ferrules 12.

Figure 2B:
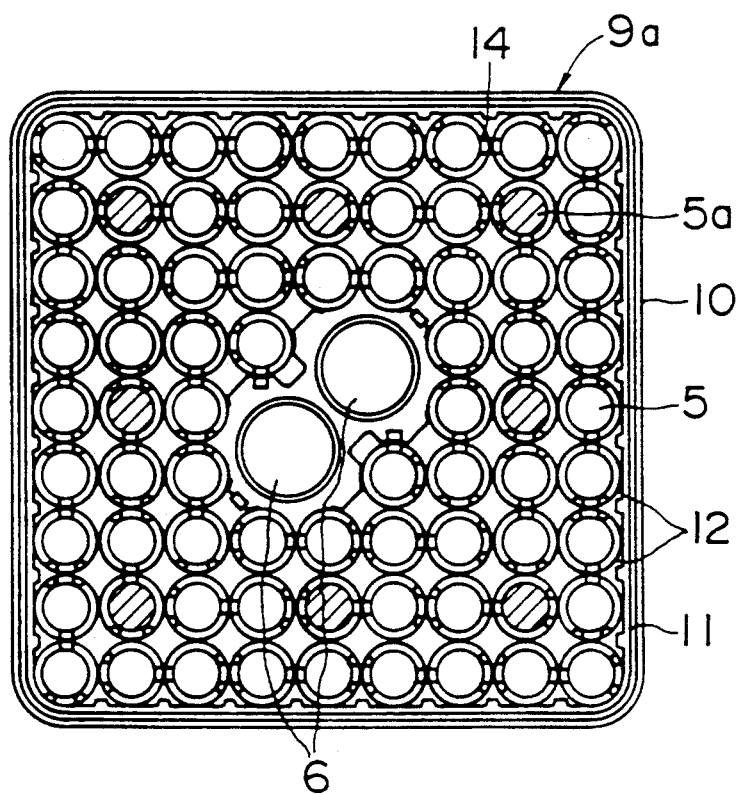
FIG. 2B is a sectional view, in an enlarged scale, taken along the line II—II of FIG. 1.

As shown in FIG. 2 and FIG. 5, two water rods 6 are arranged in the central vacant portion 18 and press supported to the bent portions 31 of the bridging pieces 17b by means of continuous loop springs 19 provided for the bridging pieces 17a. The fuel spacer 9b shown in FIG. 2A is to be attached to the upper portion of the fuel assembly 1, in which the short fuel rods 5a is formed as a vacant portion.

In the arrangement of the tubular ferrules 12 described above, as shown in FIG. 3, to the outer periphery of the bundled ferrules 12 are secured a periphery support band member 11 to which a plurality of projections 32 directed upward are formed, the projections 32 being at least inwardly bent at an intermediate portion of adjoining fuel rods 5. A pair of lobes 33 are also formed integrally with the support band member 11 at portions near the four corners thereof and so as to project outwardly to keep a distance constant between the support band member 11 and the channel box 10 surrounding the same.

As described above, according to the first embodiment, it is characterized that the petal portions 21 formed to one end of the tubular ferrules 12 are projected upwardly or downwardly from the flat portions of the upper and lower edges of the periphery support band member 11, but in a modification, the petal portions 21 may not project over the upper and lower edges of the support band member 11 by making the height of the support band member 11 higher.

The first embodiment of the present invention operates as follows.

Reactor cooling water, called herein a coolant, is fed from the lower side of a reactor core into a fuel assembly charged in the core and raises therein. That is, the coolant is first flown into the lower tie plate 4 from the lower side thereof and then rises in a flow passage formed between the fuel rods 5 and 5a in the channel box 10. Finally, the coolant flows out into an upper plenum through the upper tie plate 2. A part of the coolant flown inside the channel box 10 is fed into the water rod 6 through the coolant flow-in port 7 formed thereto and then raises upward and flows outward through the coolant flow-out port 8 also formed to the water rod 6.

As described, the coolant flown in the water rod 6 increases the percentage of the coolant at the central portion in cross section of the fuel assembly 1, thereby improving the moderation of neutrons at its central portion. For this reason, the reactivity at the central portion in the cross section of the fuel assembly 1 is made high and the power distribution in the cross sectional area is also made flat.

The coolant removes the heat of the fuel rods 5 while rising axially upward in the channel box 10 and, hence, the coolant itself is heated to a temperature from a subcooled state to a saturated state, and causes the boiling of the saturated water. Accordingly, ideally, the most desirable heat removing function will be achieved in a state in which the liquid phase (saturated water) in the coolant flow near the surface of the fuel rods and the steam phase flow in a space between the fuel rods 5 and 5.

Figure 7:
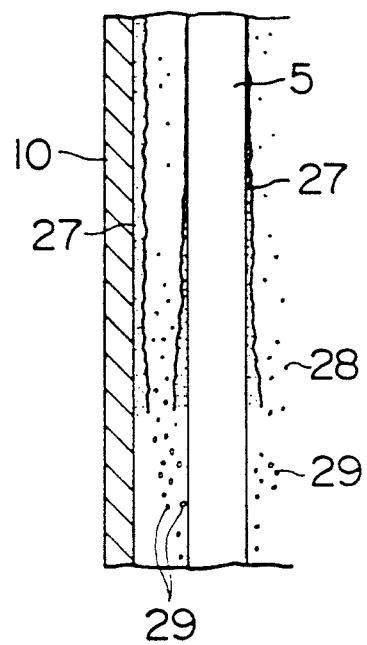
FIG. 7 is a conceptual view for the explanatory of steam-liquid phases flowing in the fuel assembly.

On the other hand, in view of the actual flow condition of the coolant in the fuel assembly, steam-liquid two phase flow called as circular flow is realized in the upper half area of the fuel assembly in which a void fraction is high and there is less margin in the heat removal. In such flow state, as shown in FIG. 7, the void fraction is made high at a space between the fuel rods 5 and 5a and the surfaces of the fuel rods 5 are covered with liquid films 27. The heat can be removed by the boiling of these liquid films 27. In FIG. 7, reference numeral 28 indicates a liquid drop and numeral 29 denotes steam voids.

Figure 8A:
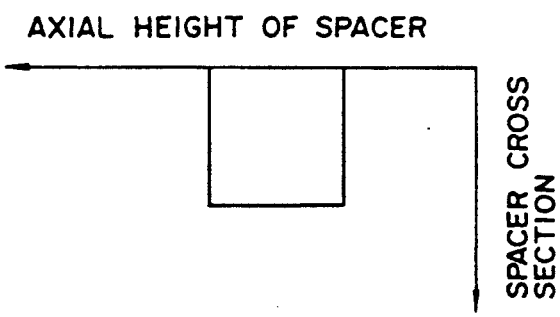
FIG. 8A is a graph showing a relationship between an axial height and a cross sectional area of a fuel spacer utilizing conventional ferrules for the explanatory of the steam-liquid two phase flow with respect to the fuel spacer.

Then, referring to Figs, 8A, 8B and 8C, in the fuel spacer of the prior art in which lower ends of the side walls of the tubular ferrules are all in the same level, when two-phase flow collides with the fuel spacers, horizontal vector of the two-phase flow in the fuel rod cell at the lower ends of the fuel spacers becomes large and the liquid films on the surfaces of the fuel rods near the lower ends of the fuel spacers are largely constricted thereby and make worse the heat removing function, whereat the transition boiling may likely be caused. The variation of the projected area of the fuel spacer becomes rectangular as shown in FIG. 8A, whereby the variation of the rapid-constriction and rapid-expansion is made large and the local pressure loss is also made large.

On the contrary, according to the structures of the fuel spacers of the present invention, as shown in Figs.

9A, 9B and 9C, the cross sectional area of the lower end of the fuel spacer is substantially trapezoidal and can be made less than one sixth (about 1/6 in this embodiment), so that the horizontal velocity vector of the steam-liquid two phase at a portion near the lower end of the fuel spacer becomes small in comparison with the conventional fuel spacer and the constriction of the liquid film 27 on the surface of the fuel rod 5 can be made small.

Figure 8B:
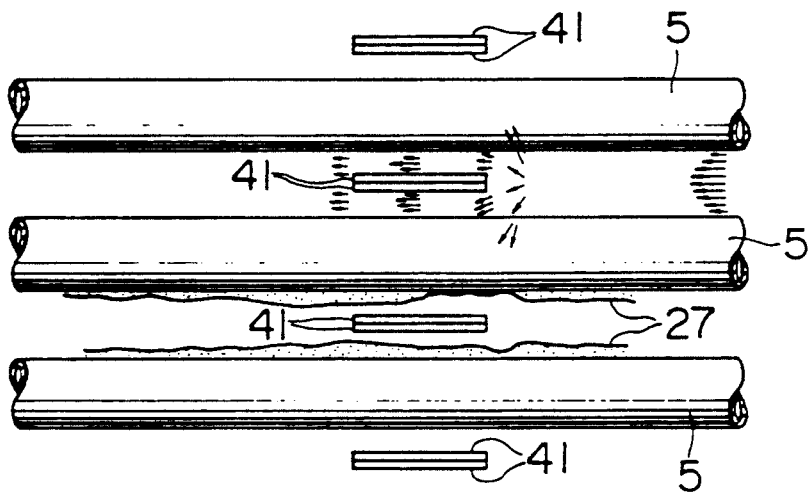
FIG. 8B is a vertical view showing fuel rods and a fuel rod cell in a right angle direction of spacer assembly.
Figure 8C:
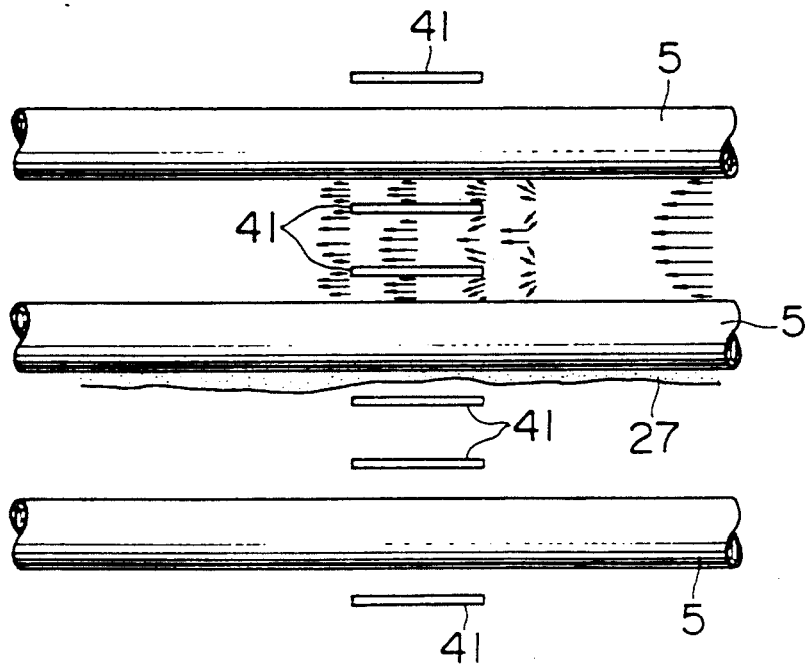
FIG. 8C is a vertical view of the fuel rods and the cell in a diagonal direction of spacer assembly.

Although the flow cross sectional area reduces gradually during the passing through the cutout portions of the end portions of the ferrules, during this passing, the flow in the tubular ferrule is guided into a flow outside the tubular ferrule having a small resistance thereby to increase the flow velocity in this flow passage 25. Consequently, the flow velocity at the space portion 24 between the fuel rods 5 in the tubular ferrule becomes small in comparison with the case of the prior art of FIG. 8 and the liquid film is made thicker.

Figure 9A:
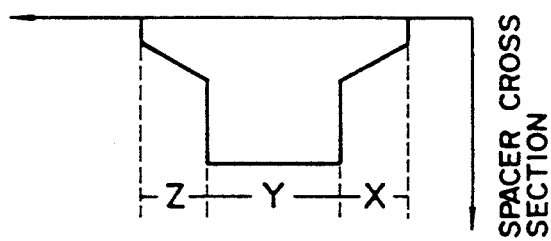
FIGS. 9A, 9B and 9C are views similar and corresponding to those of FIGS. 8A, 8B, and 8C, respectively, relating to one embodiment of the present invention.
Figure 9B:
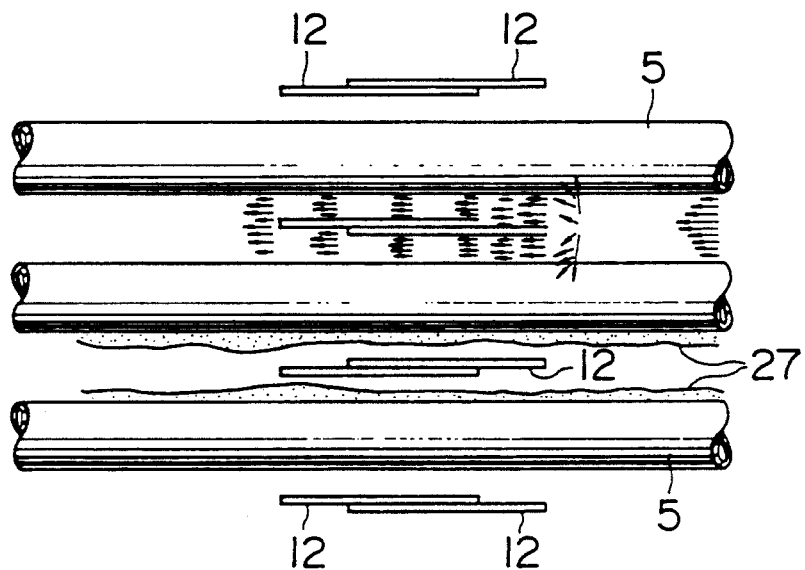
Figure 9C:
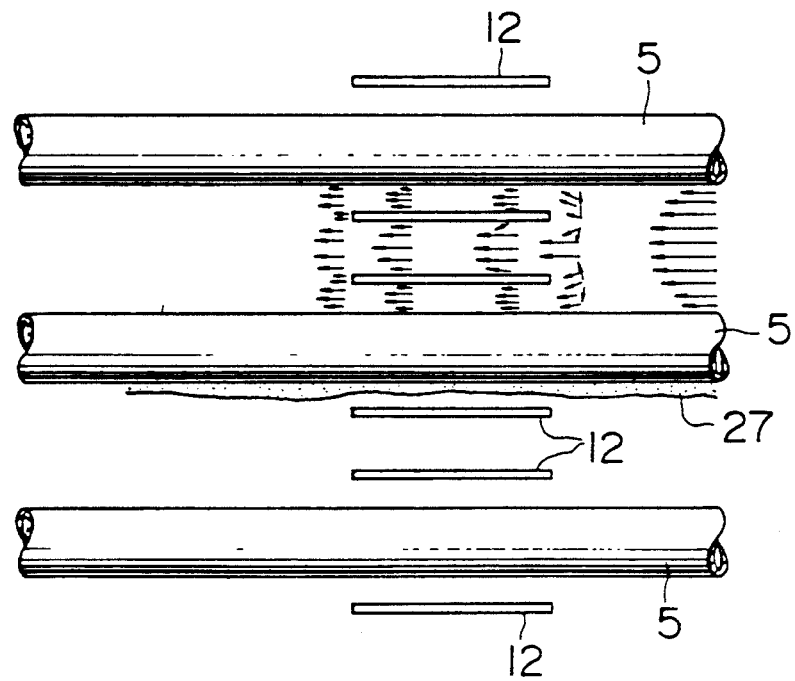

Thereafter, with reference to FIG. 9A, the steam-liquid flow reaches the full-thickened portion Y of the fuel spacer, whereat the change of the thickness thereof is about ⅔ in comparison with the conventional one and the flow distribution is made in the area X, and accordingly, the disturbance of the flow at this area Y is made small in comparison with the prior art. As this result, the constriction of the liquid film 27 can be made small. When the flow reaches the area Z, the cross sectional area of the fuel spacer is constricted to about ½ from the fully thickened state, and thereafter, the cross sectional area thereof is gradually reduced, so that the pressure loss due to the rapid expansion of the cross sectional area of the fuel spacer can be reduced.

Furthermore, the axial height of the fuel spacer is made large in appearance in comparison with the conventional one, and the frictional pressure loss increases, but the increasing of the frictional pressure loss of such extent in appearance does not give any significant adverse affect, and on the contrary, the pressure loss due to the constriction or expansion of the flow passage may be more adversely effected.

Moreover, in the described embodiment, the portions 23 to be spot welded are formed to portions on the intermediate flat portions 22 between the respective petal portions 21 formed to the end of the tubular ferrule 12, thus the spot-welding being easily carried out, and accordingly, in spite of the specific structure of the present invention, the welding assembling workings of the fuel spacer are not made complicated in comparison with the conventional workings.

Consequently, according to this first embodiment, the shape of the cross sectional area of the tubular ferrule with respect to the flow direction of the steam-liquid phase provides a smooth trapezoidal shape but not rectangular shape as in the conventional ferrule. Therefore, the local pressure loss due to the rapid constriction or rapid expansion of the flow passage at the fuel spacer can be made small, and moreover, the horizontal turbulent flow near the surface of the fuel rod 5 supported by the fuel spacer can be also made small in comparison with the conventional structure of the fuel spacer, so that the liquid film 27 on the surface of the fuel rod 5 is not peeled off or has less constriction. As this result, the pressure loss can be made small in comparison with the fuel spacer utilizing the tubular ferrules, thus contributing the improvement of the critical power output of the fuel assembly.

A second embodiment of the fuel spacer according to the present invention will be described hereunder with reference to FIG. 10.

Figure 10:
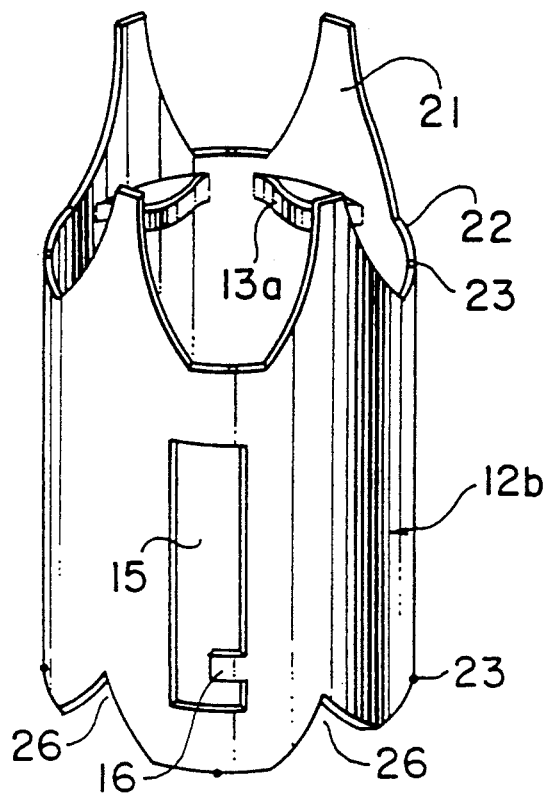
FIG. 10 is a perspective view of a fuel spacer according to a second embodiment of the present invention.

Although in the first embodiment, the fuel spacer has one end, lower end as viewed, being made flat, in this second embodiment, the ferrule 12b constructing the fuel spacer has the lower, as viewed in FIG. 10, end provided with triangular cutout portions 26 with projected portions and spot-welded portions being disposed between the adjacent triangular cutout portions 26. According to this embodiment, the cross sectional shape of the fuel spacer can be made further smooth more than that of the first embodiment.

In this second embodiment, by utilizing the tubular ferrules 12b of such structure as shown in FIG. 10, the axial cross sectional area of the fuel spacer can be made more smooth and the local pressure loss can be hence further reduced. However, since the location of such cutout portions 26 reduces the strength of the tubular ferrule 12b, it is not desired to form too large cutout portions in size and number. In view of this fact, according to the second embodiment shown, two triangular cutout portions 26 are formed at portions other than the welding portions 23 and the projected portions 13b facing the flow passage 25 surrounded by the outer wall of four tubular ferrules in the square lattice arrangement of the tubular ferrules 12b.

Figure 11:
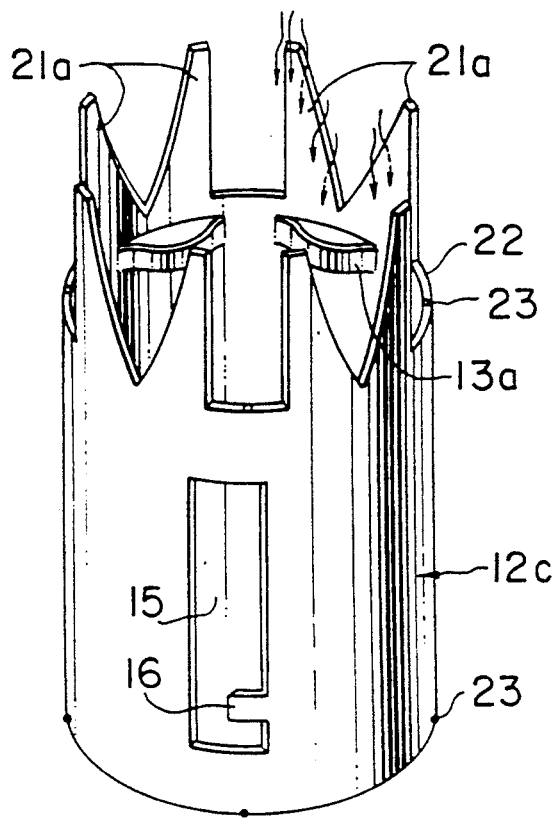
FIG. 11 is a perspective view of a fuel spacer according to a third embodiment of the present invention.

A third embodiment according to the present invention will be next described hereunder with reference to FIG. 11, showing a perspective view of a tubular ferrule 12c for the fuel spacer. In this third embodiment, V-shaped or M-shaped petal portions 21a are further formed to the trapezoidal petal portions 21 of the first embodiment. In the illustration, the lower end of the tubular ferrule 12c is made flat, but triangular cutout portions such as those 26 in the second embodiment may be additionally formed.

According to the structure of the fuel spacer utilizing the tubular ferrules 12c each shown in FIG. 11, the flow colliding with the petal portions 21a at the upstream side of the fuel spacer (in the illustration, the upper end) flows as shown by arrows in a circumferential direction along the outside and inside of the tubular ferrule 12c and along the shape of the petal portions 21a. In this embodiment, the petal portions 21a have a shape of small flow resistance and ready for guiding the steam-liquid flows into the flow passage 25 surrounded by the outer wall of the tubular ferrules 12c. On the contrary, in the embodiment of FIG. 4, the trapezoidal petal portions 21 have shaped ready for guiding to the portions 23 to be spot-welded to adjoining tubular ferrule 12, and since this portion constitutes a narrow flow passage, the flow resistance increases. Accordingly, the fuel spacer of the third embodiment is more effective in this meaning than that of the first embodiment.

Figure 12:
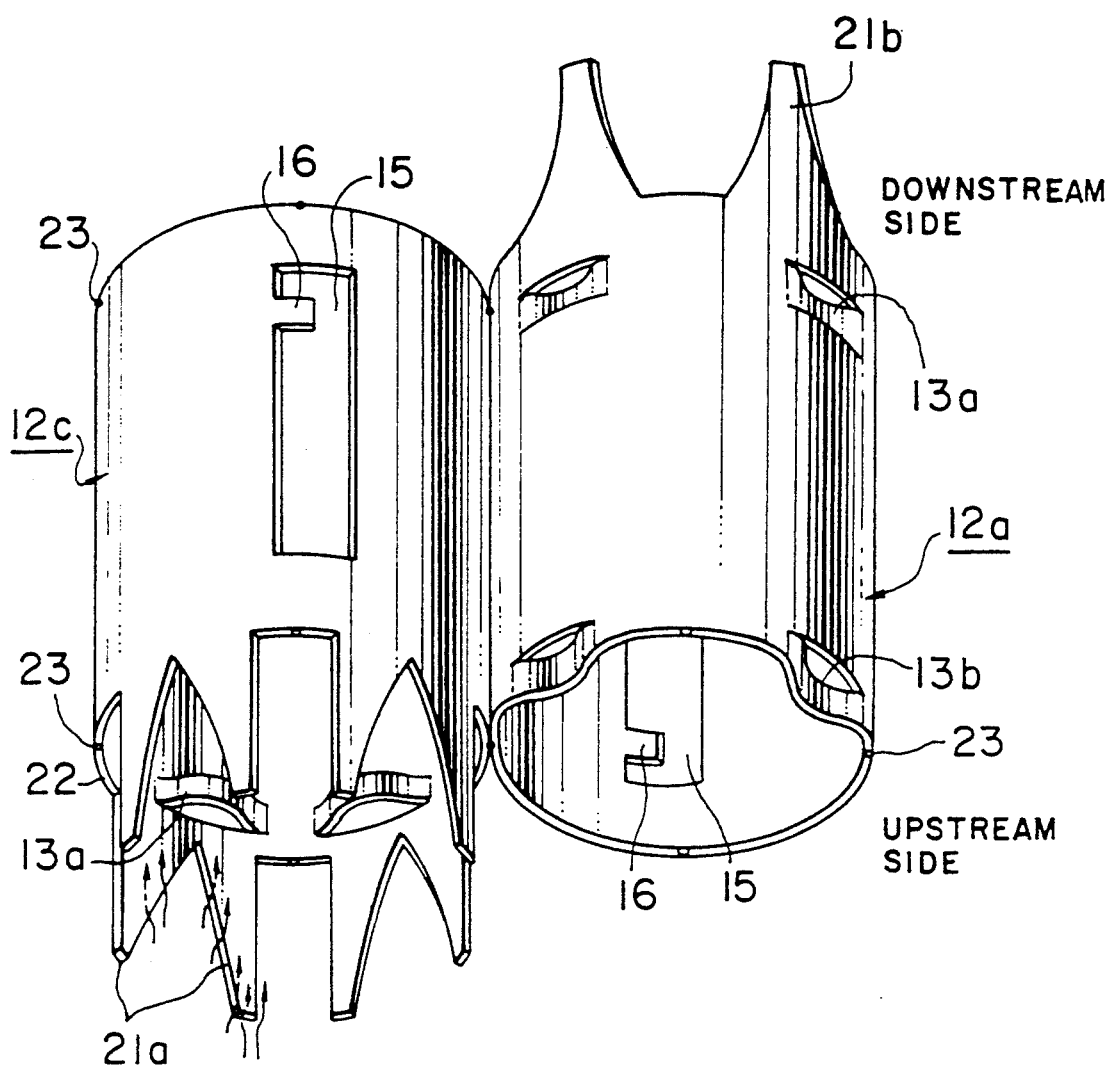
FIG. 12 is a perspective view of a fuel spacer according to a fourth embodiment of the present invention.

FIG. 12 shows a fourth embodiment of the fuel spacer composed of tubular ferrules according to the present invention. In this fourth embodiment, two kinds of ferrules are combined and, namely, in the illustration of FIG. 12, the ferrule 12a of righthand side has an upper portions 21b and a lower end having flat portion to which (downstream) end formed to have trapezoidal petal portions 21b and a lower end having flat portion to which a welding point 23 is formed. The ferrule 12c of lefthand side has an lower (upstream) end formed to have V- or M-shaped petal portions 21a as shown in FIG. 11 and an upper end having a flat portion to which a welding portion 23 is formed. These ferrules 12a and 12c are welded together at their welding points 23. The petal portions 21b of the righthand ferrule 12a are twisted in one direction outward of the ferrule 12a to form an opened upper end.

According to the combined arrangement of the ferrules 12a and 12c of FIG. 12, the V- or M-shaped petal portions of the lower end, upperstream side end, of the ferrule 12c give less local pressure loss, and the trapezoidal shape of the petal portions 21b at the downstream side of the ferrule 12a is suitable for imparting a swirlling force to the two-phase flow in the flow passage surrounded by the side wall of the ferrule 12a. Liquid drops of the two-phase flow in this passage deposite to the surfaces of the fuel rods arranged near by centrifugal force caused by the swirlling force.

The liquid drops in this flow passage flow at fast speed in the passage between the fuel rods after the passing through the fuel spacer area, so that the liquid drops contained in this flow raise in that flow passage without contributing to the heat removal of the fuel rods, thus achieving adverse cooling effect. In this embodiment, the petal portions 21b of the righthand ferrule 12a are twisted and opened outward by imparting the revolutional force thereby to enhance the cooling effect, making delay the generation of the transition boiling at the downstream side of the fuel spacer and hence contributing to the improvement of the critical power output.

Figure 13:
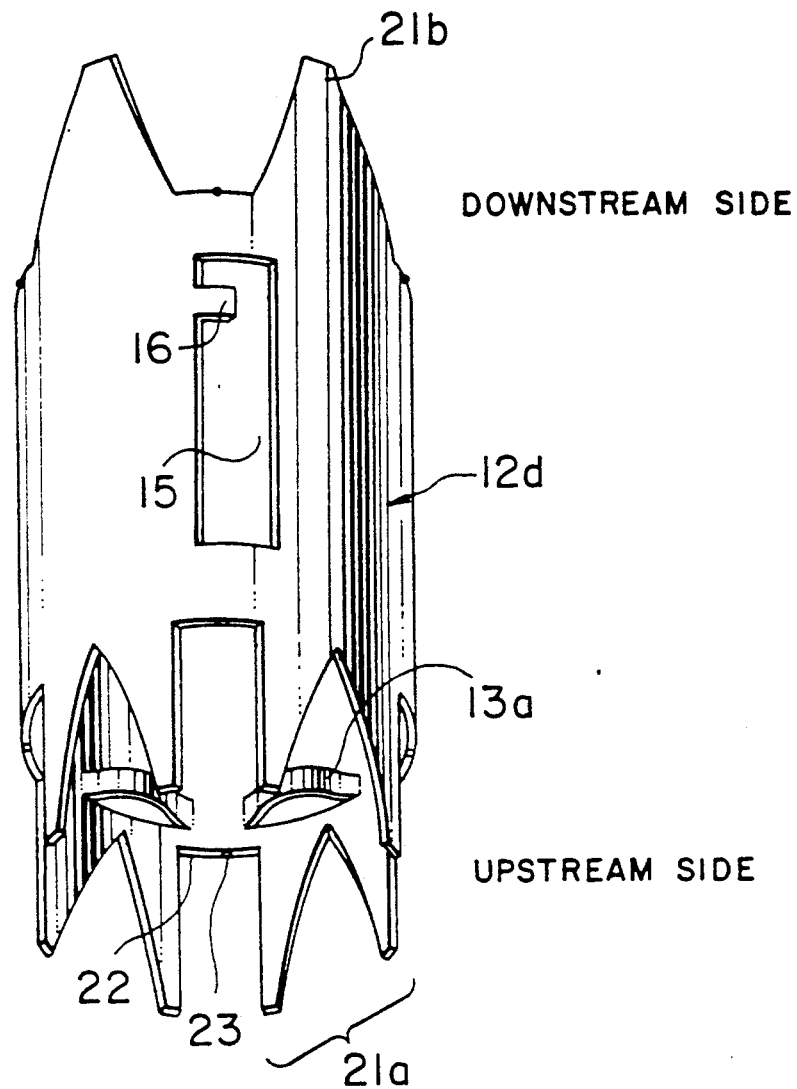
FIG. 13 is a perspective view of a fuel spacer according to a fifth embodiment of the present invention.
Figure 14:
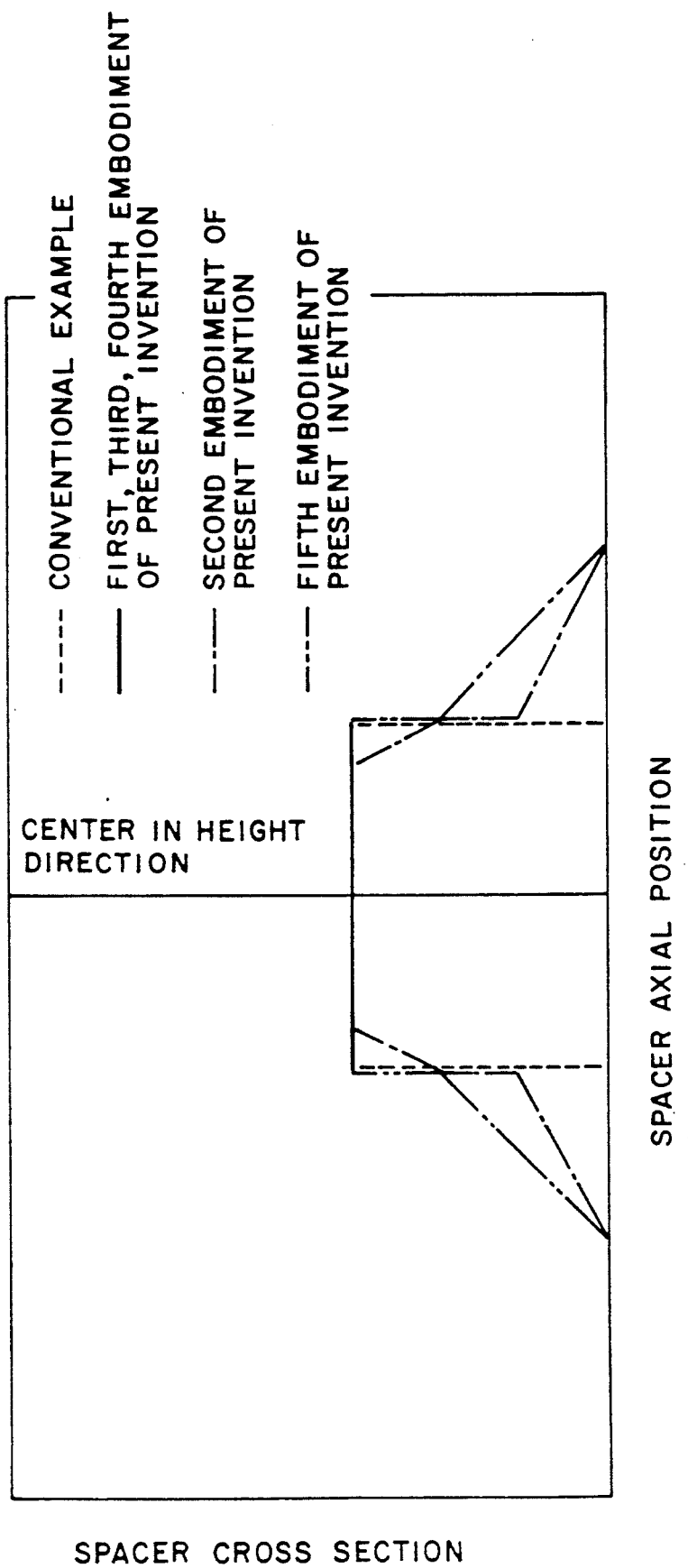
FIG. 14 is a view showing comparative characteristics relating to changes of cross sectional areas with respect to the steam-liquid two phase flows in fuel spacers according to the present invention and the prior art.
Figure 15:
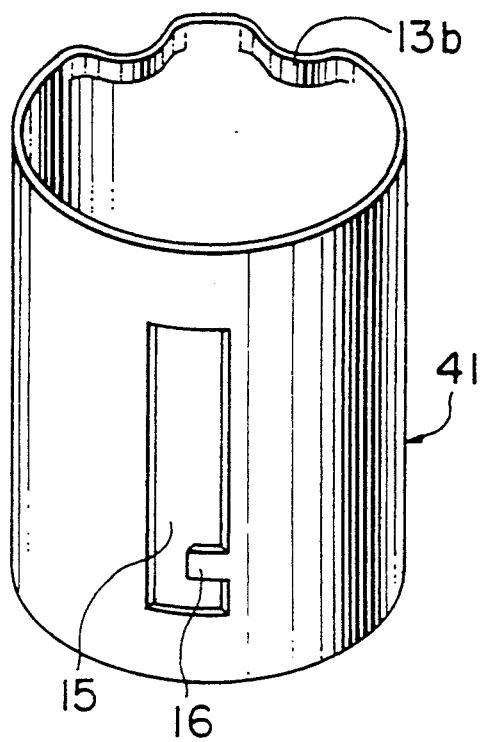
FIG. 15 is a perspective view showing a basic structure of a tubular ferrule for a fuel spacer of the prior art.

FIG. 13 represents a fifth embodiment according to the present invention, in which a tubular ferrule 12d is provided with both ends to which petal portions are formed in spite of the fact that the petal portions are formed to only the one end of the ferrule in the foregoing embodiments.

Namely, referring to FIG. 13, petal portions 21a and 21b are formed to both the ends of the tubular ferrule 12d, and in the illustration, for example, the upstream (lower) side end of the ferrule 12d has V- or M-shaped petal portions 21a and the downstream (upper) side end thereof has trapezoidal petal portions 21b as shown in FIG. 12 for achieving substantially the same effect as that of the fourth embodiment of FIG. 12.

According to this fifth embodiment, the change of the cross sectional area of the fuel spacer can be made most smooth and the pressure loss can be made small.

The outwardly twisted structure of trapezoidal petal portions formed to the downstream side end of the tubular ferrule for the individual fuel rod cell further acts as a guide for the smooth insertion of the fuel rod at a working time for charging the fuel rods into the fuel spacer in an assembling of the fuel assembly.

Figure 16:
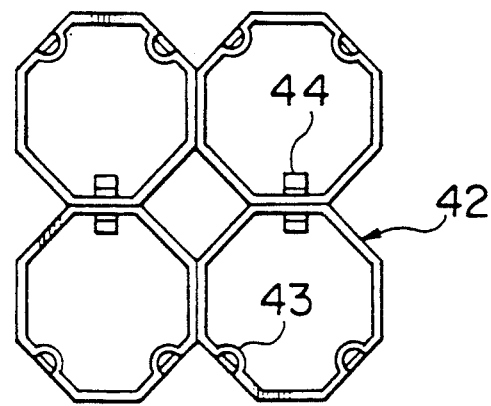
FIG. 16 is a plan view of an arrangement of octagonal tubular ferrules having basic structure for the fuel assembly of the prior art.

Although, in the foregoing embodiments, there are proposed tubular ferrules of substantially circular shape as basic structure, octagonal tubular ferrules such as shown in FIG. 16 may be utilized as the basic structure thereof.

Furthermore, according to the fuel spacer composed of the tubular ferrules of the present invention, the fuel assembly including fuel rods in 9×9 lattice arrangement including two water rods are described, but the present invention can be applied to another lattice type arrangement such as 8×8 fuel rod arrangement with various shapes or numbers of water rods.

It is also to be noted that the present invention is not limited to the described embodiments or examples, and many other changes or modifications may be made within the scope of the appended claims.

What is claimed is:

1. A fuel spacer assembly for a fuel assembly comprising:
   (a) a plurality of tubular ferrules each forming a fuel rod insertion passage in which a fuel rod is inserted;
   (b) a support means in the shape of a belt for supporting a periphery of the tubular ferrules bundled in a lattice arrangement; and
   (c) a spring means for axially supporting the fuel rods disposed in the ferrules, wherein
   (i) each of said ferrules has a cylindrical wall to which an inward projection is formed to support the fuel rod;
   (ii) adjoining ferrules are joined together horizontally;
   (iii) each of said ferrules has at least one end to which a plurality of cutouts and petals are formed around the end portion by cutting out parts of the end portion, said ferrules being reversely arranged in their axial attitudes; and
   (iv) at least one flat portion is formed between adjoining petal portions, and the adjoining ferrules are spot welded to each other at said flat portions thereof.

2. A fuel spacer assembly according to claim 1, wherein four petal portions are formed to at least one end of the ferrule.

3. A fuel spacer assembly according to claim 2, wherein each of said petal portions has a rectangular shape.

4. A fuel spacer assembly according to claim 2, wherein each of said petal portions has a trapezoidal shape.

5. A fuel spacer assembly according to claim 2, wherein each of said petal portions has a triangular shape.

6. A fuel spacer assembly according to claim 2, wherein said petal portions have V or M shape.

7. A fuel spacer assembly according to claim 1, wherein said cutout portions and petal portions are formed to both axial ends of each of said ferrules, said ferrules being arranged in the same direction.

8. A fuel spacer assembly according to claim 7, wherein said cutout portions and petal portions are formed on both axial ends of the ferrule have same shape.

9. A fuel spacer assembly according to claim 7, wherein said cutout portions and petal portions formed on both axial ends of the ferrule have shapes different from each other.

10. A fuel spacer assembly according to claim 7, wherein the petal portions formed to an end portion of the ferrule on a downstream side are twisted outward with respect to a coolant flow between fuel rods to provide revolutional flow.

11. A fuel spacer assembly according to claim 1, wherein the adjoining ones of said ferrules are joined together such that an end portion of one ferrule to which the cutout portions are formed is spot welded to an end portion of another ferrule to which any cutout portion is not formed.

12. A fuel spacer assembly according to claim 11, wherein the cutout portions formed to an end portion of the ferrule on a downstream side are twisted outward with respect to a coolant flow between fuel rods to provide revolutional flow.

13. A fuel spacer assembly according to claim 1, further comprising bridging pieces for bridging ferrules arranged centrally in the lattice arrangement of the ferrules and supporting a water rod disposed centrally in the lattice arrangement.

14. A fuel spacer assembly according to claim 1, wherein said support means is provide with lobes projected outward for keeping constant a distance between a channel box of the fuel assembly.

15. A fuel spacer assembly according to claim 1, wherein each of said tubular ferrules has substantially a circular cross section.

16. A fuel spacer assembly according to claim 1, wherein each of said tubular ferrules has substantially an octagonal cross section.

17. A fuel spacer assembly for a fuel assembly comprising:
   (a) a plurality of tubular ferrules each forming a fuel rod insertion passage in which a fuel rod is inserted;
   (b) a support means in the shape of a belt for supporting a periphery of the tubular ferrules bundled in a lattice arrangement; and
   (c) a spring means for axially supporting the fuel rods disposed in the ferrules, wherein
   (i) each of said ferrules has a cylindrical wall to which an inward projection is formed to support the fuel rod;
   (ii) adjoining ferrules are joined together horizontally;
   (iii) each of said ferrules has at least one end to which a plurality of cutouts and petals are formed around the end portion by cutting out parts of the end portion, said ferrules being reversely arranged in their axial attitudes and said petals having a shape selected from the group consisting of triangular, trapezoidal, V and M; and
   (iv) at least four flat portions are formed between adjoining petal portions, and the adjoining ferrules are spot welded to each other at said flat portions thereof.

18. A fuel spacer as claimed in claim 17, wherein each of said petal portions has a trapezoidal shape.

19. A fuel spacer as claimed in claim 17, wherein each of said petal portions has a triangular shape.

20. A fuel spacer as claimed in claim 17, wherein said petal portions have a V or M shape.

* * * * *